INVENTOR.
HOMER F. ROLAND
BY
ATTORNEY
AGENT

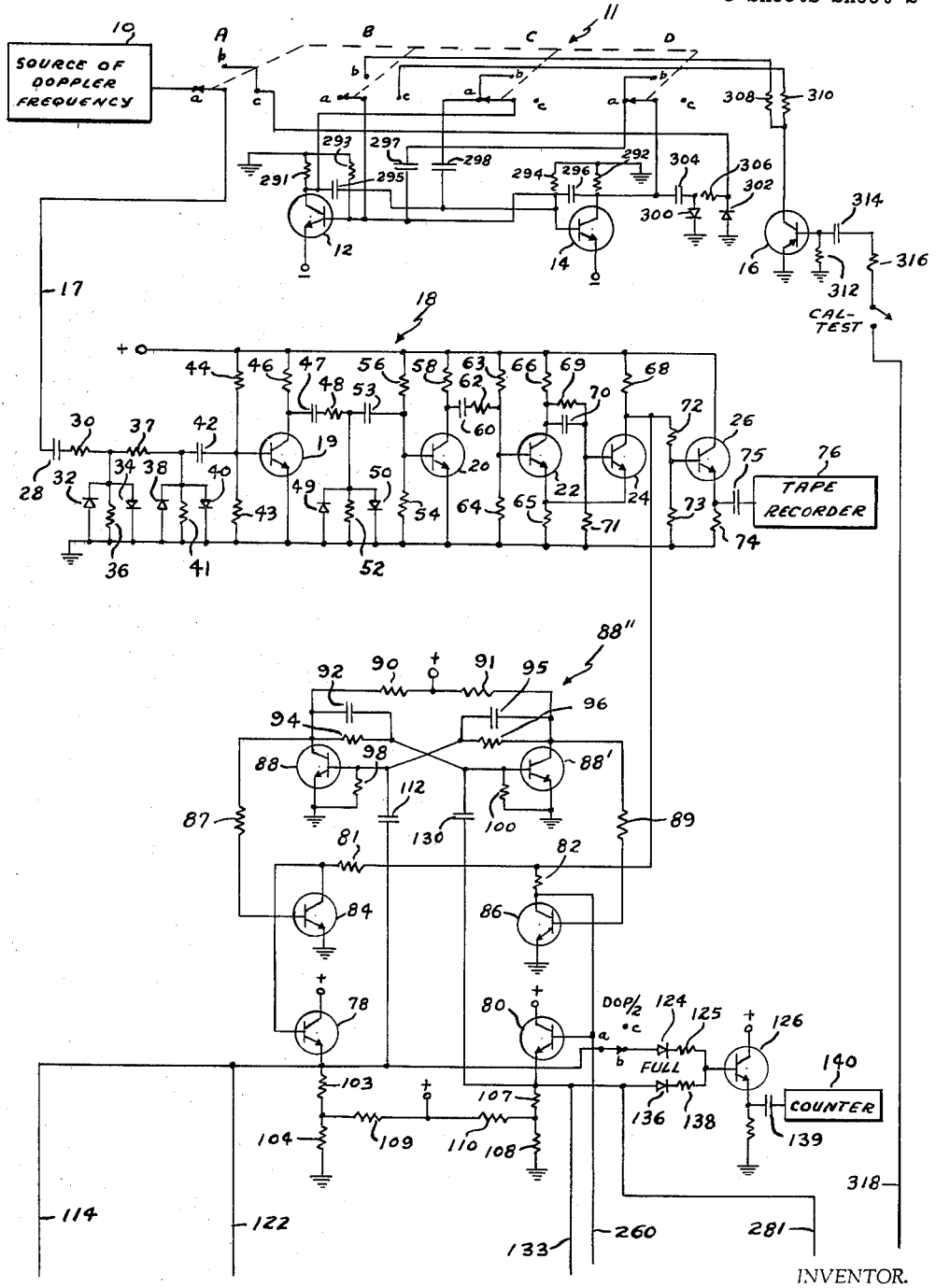

United States Patent Office 3,201,791
Patented Aug. 17, 1965

3,201,791
NEAR MISS DISTANCE SCORING SYSTEM USING DOPPLER EFFECT
Homer F. Roland, Fort Walton Beach, Fla., assignor to the United States of America as represented by the Secretary of the Air Force
Filed Feb. 13, 1964, Ser. No. 344,795
6 Claims. (Cl. 343—12)
(Granted under Title 35, U.S. Code (1952), sec. 266)

The invention described herein may be manufactured and used by or for the United States Government for governmental purposes without payment to me of any royalty thereon.

This invention relates to a proximity detector scoring system and, particularly, to a scoring system for determining the miss distance between an airborne target and projectiles fired at the target.

Present day military training methods in gunnery practice, whether involving air-to-air, air-to-ground, or ground-to-air instruction, require the firing of projectiles, missiles, ammunition, and the like, at a target, may be con- a "kill," i.e., total destruction of the target, may be considered complete without scoring a direct hit. A need therefore exists for a near miss distance scoring system which will adequately and reliably determine the performance of the equipment and the marksmanship of the person or persons doing the firing. The value of prior art scoring systems is diminished because of the sensitivity of the sensing equipment to the bow waves of munitions travelling at supersonic speeds, and also because of the delay between the acquisition of raw data and the reduction of this data to near miss distance. Particular scoring difficulties have been experienced in electronic scoring systems using the Doppler effect, where the microwave frequency has been above 1000 mc. Where a radar system is not immune to the shock caused by bow waves during supersonic motion, doubts are raised as to the accuracy of certain parts of the recorded data. Thus, it becomes necessary to collect all pertinent data prior to the arrival of the bow wave at the sensing devices. By terminating data acquisition immediately after the point of closest approach, which is when bow wave distrubance is felt, the minimum spatial separation between the target and the fired object may conclusively be determined.

Accordingly, an object of the invention is to provide a miss scoring system which is unaffected by the deleterious effects imposed by shock waves accompanying those intercept objects travelling at supersonic speeds.

Another object of the invention is to provide a miss distance scoring system which records firing results in a manner quickly and easily convertible to miss distance.

A further object of the invention is to provide, in connection with attack and intercept objects, a miss distance scoring system aboard the attack object having a known acquisition range outside of which intercept objects are eliminated from scoring consideration.

Yet another object of the invention is to provide a miss distance scoring system which operates during a very small fraction of the time an intercept object and the target it seeks are moving toward each other.

Still another object of the invention is the provision of a miss distance scoring system in which the number of Doppler-shifted echo signals returning to a target after reflection from an approaching intercept object is translated conveniently into miss distance figures.

To attain the foregoing objects, a high frequency pulse radar system disposed aboard an airborne target transmits short pulses whose duration sets the range outside of which the target radar can not effectively track approaching objects. A receiver disposed adjacent the transmitter receives power from both the transmitter and the approaching object and is turned off during the interpulse interval. For object moving toward the target which enters the acquisition ring established by the pulse width of the transmitted energy, the phase of the echo returns shifts continuously due to the Doppler effect. The Doppler-shifted returns are mixed with energy at the transmitter frequency giving, after detection, a Doppler beat of decreasing frequency which is amplified and then employed to modulate a standard FM telemetry transmitter which beams its output to a ground station telemetry receiver. The output of the ground station telemetry receiver is injected as input data into the miss distance scoring system of the invention. The downward frequency shift of the Doppler pulsation continues as long as the distance between the target and the fixed object is decreasing and at a rate proportional to the change in differential velocity. During this time, continuous evidence of the successive increases in the recurring Doppler wavelengths is obtained through a cycle-to-cycle comparison of the wavelengths of each pair of cycles at the Doppler frequency. The Doppler frequency signals executed during the brief period between acquisition of a fired object and the point of closest proximity of that object to the target drive an indicator from which an expression of miss distance in conventional units is obtained. Changeover to a post-measurement condition once the intercept object passes the target is brought about during the interval embraced by the wavelengths of the two Doppler cycles occurring immediately after the point of closest approach. Once crossover occurs, and the fired object begins to recede from the target, the Doppler pulsations abruptly increase in frequency, so that the next wavelength comparison shows a downward change in wavelength of the Doppler cycles. Means responsive to the sudden decrease in wavelength are effective to halt further registration of the indicator equipment. At this time, with the indicating equipment effectively turned off, the results obtained before the buffeting occurs can not be invalidated so that the miss distance between the target and each fired object, successful in penetrating within the effective tracking range of the target radar, is decisively established.

Complete understanding of other objects and features of the invention not specifically mentioned may be had from the following description of a preferred embodiment of the invention when read in conjunction with the accompanying drawings, in which:

FIG. 1 is a geometric presentation in accordance with the invention useful for explaining the pulse Doppler technique of scoring near miss distance between intercept and attack objects;

FIGS. 2a and 2b, when placed one above the other, form a schematic diagram of the near miss distance indicator embodying the invention;

Figure 1:
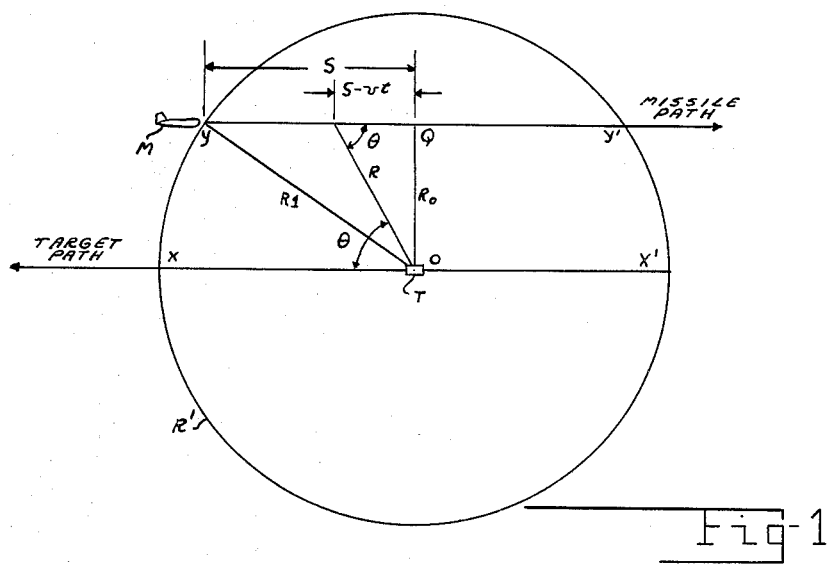

Referring now to FIG. 1, a mathematical analysis of the pulse Doppler scoring technique employed in the invention for calculating miss distance between an attacking object and an intercept object will be given. In FIG. 1, a target T, which may be of the usual airborne type, i.e., either towed or in self-sustained flight, has a flight path defined by the line X–X' and a present location at O. When one or more intercept objects M, which may be, for example, rockets, missiles, or similar projectiles, are fired, they move toward the target along a trajectory which reduces the distance or range to the target as a projectile closes with the target and increases the range as a projectile recedes from the target, barring a direct hit. Simplification having been adopted, the trajectory of projectile M is defined by a line Y-Y' shown parallel to the line X-X'. In order to allow the target to track the progress of projectiles launched toward it, target T is provided with a conventional pulse radar system (not shown) including a transmitter, a receiver, and means for turning off the receiver except during the pulse duration of each emitted pulse. Very satisfactory results have been realized using a transmitter frequency of 4550 kc., a pulse repetition frequency of 100 kc., and a pulse duration of 100 nanoseconds. These values may be varied, as will be seen. The pulse length sets the range outside of which the radar system can not effectively track objects, this range variously being referred to as the receiver range gate, radial range, and radar range. In the present system, a pulse duration of 100 nanoseconds corresponds to a receiver range gate of roughly 50 feet which is the radial distance between points O and Y and, which, when swept 360°, establishes an acquisition ring R' which missiles must enter in order to be visible to the transmitter pulses. Thus, assuming that the receiver range gate is known, data reduction for miss distance between the target and the projectile can be achieved using the number of Doppler cycles executed between the time the projectile first enters the acquisition ring R' and the time the distance between the projectile and the target begins to increase. In an electromagnetic Doppler scoring system of the invention, operating with a radio frequency of 4550 mc., Doppler frequency shifts have been detected in the range from a few cycles per second to well upward into kilocycles per second, depending on the differential velocity. Thus, when projectiles approaching the target are outside the acquisition ring, the echo returns arrive at the receiver during the interpulse interval and, therefore, any reflections are not detected. Inside the acquisition ring, echo returns are produced at the receiver slightly changed in pitch according to the well-known Doppler effect. The echo returns in the receiver are mixed with a fraction of the energy of the transmitted pulse thereby giving a resultant Doppler frequency which, with reference to FIG. 1, may be expressed by the relation:

$$f_d = \frac{2f_o v \cos \theta}{c} \quad (1)$$

where $f_d$ = the instantaneous Doppler shift,
$f_o$ = the frequency of the transmitter,
$v$ = the speed of the projectile relative to the target,
$c$ = the speed of light,
$\theta$ = the angle formed by the intersection of line Y-Y' and a line representing the instantaneous miss distance,
$R$ = the instantaneous miss distance,
$R_1$ = the receiver range gate,
$R_o$ = the near miss distance,
$S$ = the distance from the point of acquisition and the point of nearest miss distance.

Since the distance $R_1$ from the target to point Y is determined by the pulse duration, it is a known quantity. The distance $R_o$ is the desired miss distance. To obtain the distance $R_o$, the distance S to the point Q, where $R_o$ intersects the flight path of the fired object, must be calculated. This distance is readily obtained by counting the number of Doppler cycles elapsing as the fired object covers the distance between Y and Q. The total number of Doppler cycles, N, may be obtained by integrating Equation 1 over the duration of that flight path. Thus, $$N = \int_0^{S/v} f_d \, dt \quad (2)$$

$$= \int_0^{S/v} \frac{2f_o v}{c} \cos \theta \, dt \quad (3)$$

Figure 3:
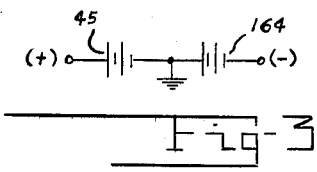
FIG. 3 shows an arrangement of direct current sources.

From FIG. 3, $$\cos \theta = \frac{S - vt}{\sqrt{R_o^2 + (S - vt)^2}} \quad (4)$$

Substituting, $$N = \frac{2f_o v}{c} \int_0^{S/v} \frac{S - vt}{\sqrt{R_o^2 + (S - vt)^2}} \, dt \quad (5)$$

Solving $$\mu = S - vt \text{ and } d\mu = -v \, dt$$

then $$N = \frac{-2f_o}{c} \int_0^S \frac{\mu}{\sqrt{R_o^2 + \mu^2}} \, d\mu \quad (6)$$

$$= \frac{2f_o}{c} [(R_o^2 + \mu^2)^{1/2}]_S^0 \quad (7)$$

$$= \frac{2f_o}{c} [R_o - (R_o^2 + S^2)^{1/2}] \quad (8)$$

Substituting $S^2 = R_1^2 - R_o^2$ $$N = \frac{2f_o}{c} [R_o - (R_o^2 + R_1^2 - R_o^2)^{1/2}] \quad (9)$$

$$N = \frac{2f_o}{c} [R_1 - R_o] \quad (10)$$

Since $$\lambda = \frac{c}{f_o} \quad (11)$$

Therefore, $$R_o = R_1 - \frac{\lambda N}{2} \quad (12)$$

From Equation 12, is will be appreciated that, with the wavelength λ of a Doppler system and the receiver range gate $R_1$ known, data reduction for calculating miss distance by directly using the count of detected Doppler cycles can expediently be made.

Figure 2B:
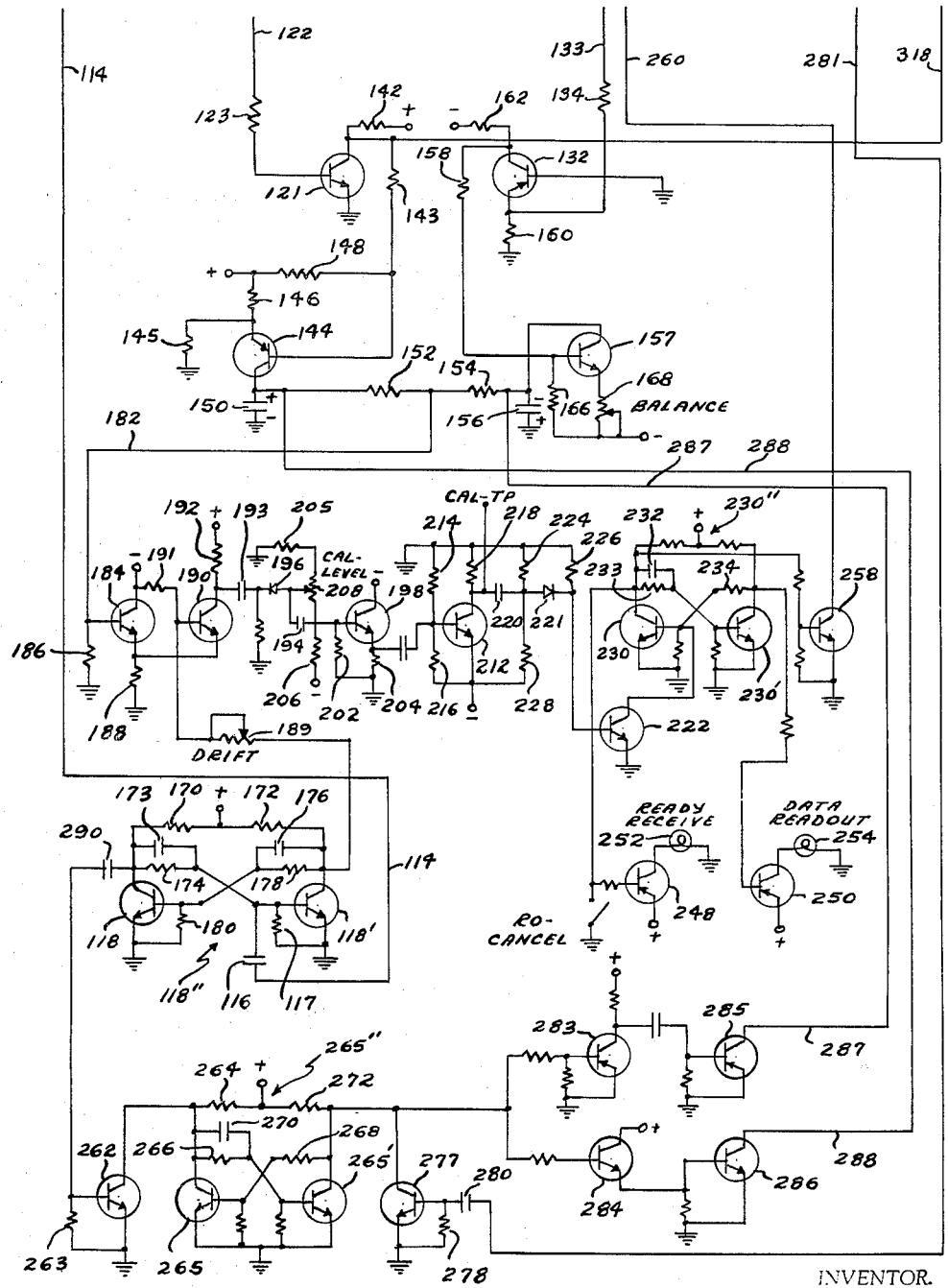

Much of the discussion relating to the theory underlying the operation of Doppler frequency shift radar systems has been for illustration only inasmuch as such systems are old in the art. But, heretofore, when applied for the purpose of determining miss distance between a target and a projectile moving to intercept the target, nothing employed successfully rendered such systems immune to the severe buffeting caused by projectiles moving at speeds in the supersonic range. The consequent confusion with regard to that portion of the Doppler count acquired during the period simultaneous with the impact of the shock wave is one undesirable manifestation of microphonics. It has, therefore, been appropriate to first discuss a typical Doppler arrangement which yields a coherently generated Doppler frequency signal advantageously useful as input data to the system of the present invention. Such a system is shown in FIGS. 2a and 2b.

In FIG. 2a, the output of a source 10 of Doppler frequency signals is applied to terminal a of section A of a ganged manual switch having three other sections B, C and D. Each rotor of the switch is movable between positions a, b and c. The switch has connections to a calibration circuit 11 comprising transistors 12, 14 and 16, about which more will be said below.

With the rotors of the switch all set to terminal a, the Doppler frequency signals from source 10 are applied over line 17 to a squaring circuit generally designated 18 including transistors 19, 20, 22, 24 and 26. The signals are fed serially through a capacitor 28 and resistor 30 to a first clipper formed by reverse-connected diodes 32 and 34 paralleled to ground with a resistor 36. It will be appreciated that at a certain value of forward-bias voltage, the current through diode 32 on the negative half-cycle, and through diode 34 on the positive half-cycle, increases rapidly. The alternate breakdown periods of each diode in the forward direction transforms each Doppler frequency cycle to an amplitude-reduced wave whose period remains identical to the Doppler frequency cycle. The breakdown voltage will vary depending on the characteristics of the particular diodes used.

The clipped Doppler frequency signals from diodes 32 and 34 are fed through a resistor 37 to a second clipper formed by reverse-connected diodes 38 and 40 paralleled to ground with a resistor 41. Similar clipping action on the waveforms ensues whereupon the signals are coupled to transistor 19 by a capacitor 42. A voltage divider, comprising resistors 43 and 44, is between ground and the positive terminal (+) of a suitable source of direct current such as, for example, the battery 45 shown in FIG. 3. Collector voltage for transistor 19 is provided through a load resistor 46.

After amplification in T-19, the amplified signals are applied through a capacitor 47 and resistor 48 to a third clipper formed by reverse-connected diodes 49 and 50 paralleled with a resistor 52 to ground. Now with further shaping, the Doppler frequency signals are coupled through a capacitor 53 to T-20. A voltage divider comprising resistors 54 and 56 is between the positive terminal (+) and ground. A load resistor 58 serves in the collector circuit of transistor 20.

After further amplification in T-20, the amplified signals are fed serially through a blocking capacitor 60 and a resistor 62 to T-22. A voltage divider, the midpoint of which is connected to the base of transistor 22, is formed by series resistors 63 and 64 which are connected between positive terminal (+) and ground. Transistors 22 and 24 share a common emitter resistor 65 and form a Schmitt trigger circuit well known in the art for squaring an input signal. Collector voltage for transistors 22 and 24 is obtained through resistors 66 and 68, respectively. Voltage coupling is performed by a capacitor 69 and a resistor 70. The base of T-24 is connected through a resistor 71 to ground. It will be understood that the square wave at the collector of T-24 is constant in amplitude and contains the Doppler frequencies in the wave periods.

The emitter-follower transistor 26 receives the squared signals from T-24 over a resistor 72. Base and emitter resistors 73 and 74 connect these electrodes to ground. The Doppler pulsations at the emitter of T-26 are capacitively fed to a suitable recorder which, for example, may be a magnetic tape recorder or the like, by which the Doppler cycles may be recorded and preserved for documentation and further study.

The collector signal of T-24 is also fed to transistors 78 and 80 through resistors 81 and 82, respectively. Resistors 81 and 82 also serve as load resistors for transistors 84 and 86, respectively, which in turn, serve as switches for controlling the operation of transistors 78 and 80. The base of T-84 is coupled through resistor 87 to the collector of a transistor 88 which, with a transistor 88′, comprises a monostable multivibrator generally indicated 88″. The base of T-86 is coupled to the collector of T-88′ through resistor 89.

The positive terminal (+) provides the necessary collector voltage for transistors 88 and 88′ through load resistors 90 and 91, respectively. The collector signal voltage of T-88 is coupled to T-88′ through capacitor 92 and resistor 94; in reverse, the collector signal voltage of T-88′ is coupled to T-88 through capacitor 95 and resistor 96. Base resistors 98 and 100 are indicated. The constants of MVB-88″ are chosen so that in the quiescent condition, i.e., with no Doppler frequency signal at the collector of T-24, MVB-88″ stabilizes with T-88′ conducting and T-88 cut off, placing the collector of T-88 at maximum positive voltage and the collector of T-88′ substantially at ground due to the essentially shorted collector-emitter junction of T-88′. The positive collector voltage of T-88, coupled to T-84, moves T-84 to conduct. On the other hand, T-86 is cut off because of the near ground level of the collector voltage of T-88′. It follows, therefore, that in the quiescent condition, the base of T-78 is shorted essentially to ground through the collector-emitter circuit of T-84. However, no such path to ground exists at this time from the base of T-80 inasmuch as the collector current of T-86 is held to a minimum due to the essentially zero collector voltage of T-88′.

Referring now to transistors 78 and 80, the emitter of T-78 is provided with two serially arranged resistors 103 and 104. Likewise, emitter resistors 107 and 108 serve in the emitter circuit of T-80. Emitter bias for transistors 78 and 80 is established by resistors 109 and 110, respectively. With no polarity inversion of signals applied to its base, the output voltage of T-78 is applied over a first path including a capacitor 112 and a resistor 98, which differentiates the output, a second path including line 114, a capacitor 116 (FIG. 2a) which, with a base resistor 117 of a transistor 118′ forming a monostable multivibrator 118″ including a transistor 118, also performs a differentiating action, a third path to a transistor 121 by means of line 122 and a resistor 123 and, lastly, a fourth path which includes the rotor a of a two-terminal switch having fixed terminals b and c designated herein FULL DOP and DOP/2, respectively. The FULL DOP terminal b is coupled to the anode of a diode 124 whose cathode, by means of a resistor 125, is connected to an emitter-follower transistor 126. Similarly, with no polarity inversion of base input signals, the output voltage of T-80 is applied over a first path to T-88′ in which a capacitor 130 and resistor 100 provide a differentiating action, a second path to the emitter of a transistor 132 by means of line 133 and resistor 134, a third path connecting with the anode of a diode 136 whose cathode, by means of a resistor 138, is connected to the base of T-126 and, lastly, a fourth path including line 281 and a capacitor 280 to a transistor 277.

Like transistor 26, the output of T-126 is capacitively coupled to a recording device which, in the illustrated embodiment, is a counter 140 which, as will be seen, indicates the number of Doppler cycles generated between acquisition of an intercept object and passage of the object past the target at the nearest closing distance.

The collector of T-121 is coupled through load resistor 142 to positive terminal (+) and, through a resistor 143, to a transistor 144 having an emitter resistor 145, a resistor 146 connecting the emitter to positive terminal (+), and a base resistor 148 connected to positive terminal (+). The collector of transistor 144 is coupled to ground by a capacitor 150. Also connected to the collector are serially-arranged resistors 152 and 154, the latter of which is, on the one hand, connected to a capacitor 156 grounded at one end and, on the other hand, connected to the collector of a transistor 157 which is fed over resistor 158 by T-132. In the preferred embodiment, resistors 152 and 154 are made equal. Likewise, the values of capacitors 150 and 156 are the same. Resistor 160 is in the emitter circuit of T-132 whereas resistor 162 couples the collector to the negative terminal (−) of a suitable source of direct current such as, for example, the battery 164 shown in FIG. 3. Similarly, a resistor 166 couples the base of T-157 to negative terminal (−). An adjustable resistor 168, herein given the designation BALANCE, is connected between the emitter of T-157 and negative terminal (−).

Turning now to multivibrator 118″, the positive terminal (+) provides the necessary collector voltage for transistors 118 and 118′ through load resistors 170 and 172, respectively. The collector signal voltage of T-118 is coupled to T-118′ through capacitor 173 and resistor 174; in reverse, the collector signal voltage of T-118′ is coupled to T-118 through capacitor 176 and resistor 178. Base resistors 180 and 117 are shown. The constants of multivibrator 118″ so are chosen that, in the quiescent condition previously explained, multivibrator 118″ stabilizes with T-118′ conducting and T-118 nonconducting. This places the collector of T-118 at the potential of the positive terminal (+) and places the collector of T-118′ substantially at ground due to the essentially-shorted collector-to-emitter junction of T-118′.

A line 182 couples the difference in voltage across capacitors 150 and 156 as slightly reduced by the drop across resistors 152 and 154 to a transistor 184 having base and emitter resistors 186 and 188, respectively. The emitter of T-184 is directly tied to the emitter of a transistor 190 whose base is coupled to negative terminal (−) through a resistor 191. An adjustable resistor 189, herein given the designation DRIFT, is between the collector of T-118′ and the base of T-190. The output of T-190 is coupled through serially-connected capacitors 193 and 194 and diode 196 to an emitter-follower transistor 198 having base and emitter resistors 202 and 204, respectively. Connected between negative terminal (−) and ground is a voltage divider comprising resistors 205 and 206 and a variable resistor 208 herein designated CAL-LEVEL. With no inversion, the output of T-198 is capacitively fed to a transistor 212 whose emitter is connected to negative terminal (−). Bias voltage in the emitter-base circuit of T-212, which normally renders T-212 conducting in the absence of input signals, is provided by a voltage divider comprising resistors 214 and 216. The collector of T-212 is returned to ground through a resistor 218 and also is connected, through a capacitor 220 and a diode 221, to a transistor 222. Diode 221 is connected between resistors 224 and 226 which, in turn, are grounded. A resistor 228 interconnects the anode of diode 221 and negative terminal (−).

The collector of T-222 is coupled directly to a transistor 230 which forms with a transistor 230′ a bistable multivibrator generally designated 230″. Coupling of the signal from T-230 is through a capacitor 232 and resistor 233 whereas, from T-230′, the output signal is supplied to T-230 through a resistor 234. The usual base and load resistors complete the multivibrator circuit.

In near symmetry, the signals at the collectors of transistors 230 and 230′ are resistively fed to transistors 248 and 250, respectively. A portion of the available signal at the collector of T-230 is also coupled to a transistor 258 which, over a line 260, supplies a feedback signal to the base of T-80 for controlling its operation. The READY RECEIVE and DATA READOUT lamps 252 and 254 in the collector circuits of transistors 248 and 250 are indicative of system condition. Closing the RO-CANCEL switch follows at the end of the scoring of each missile and thus restores the system to a condition receptive for scoring the next attacking missile. With the RO-CANCEL switch closed, the collector of T-230 is placed at ground potential, T-248 is biased heavily in the forward direction which causes the READY-RECEIVE lamp to light, and T-258 is cut off. Under these conditions, T-230′ likewise is rendered cut off with the result that T-250 is cut off and, consequently, the DATA-READOUT lamp remains dark. The RO-CANCEL switch is now opened. The high positive voltage at the collector of T-230′ biases the base of T-230 in the forward direction. The resulting effectively grounded collector-emitter junction of T-230 now sustains the flow of collector current of T-248. Following this reasoning, the steady illumination of the READY-RECEIVE lamp and the darkness of the DATA-READOUT lamp represents one of the stable states of MVB-230″ and the readiness of the miss distance scoring system of the invention to process incoming Doppler frequency signals.

Referring now to multivibrator 118″, the collector of T-118 is coupled to a transistor 262 having a base resistor 263 and a load resistor 264 which also serves as the load for a transistor 265 so combined with a transistor 265′ as to form a monostable multivibrator generally designated 265″. Coupling resistors 266 and 268 and capacitor 270 as well as load resistors 264 and 272 and the usual base resistors are conventionally shown. Resistor 272 also serves as the load for T-277 whose base resistor 278 is made equal to base resistor 263 of transistor 262. Capacitor 280 and line 281 furnish a feedback path between the base and emitter loads of transistors 277 and 80, respectively, whereby MVB-265″ at certain times may be reset by the pulse developed in the emitter circuit of transistor 80. During the quiescent state, due to selective assignment of component values, transistors 262 and 265 are cut off and transistors 265′ and 277 are conducting.

The output of MVB-265″, and necessarily that of T-277, is coupled to transistors 283 and 284 which, in turn, control the operation of transistors 285 and 286. By means of a line 287, the collector of T-285 is coupled to the negative or upper terminal of capacitor 156. Likewise, the collector of T-286 is coupled, by means of a line 288, to the positive or upper terminal of capacitor 150. Inasmuch as the collector voltages of transistors 265′ and 277 in the quiescent state are near ground level, transistors 283 and 284 are cut off. It follows, therefore, that, with no input signals applied, transistors 285 and 286 are also cut off.

*Operation*

In the operation of the miss distance scoring system of the invention, let it be assumed that a Doppler radar system of the type previously discussed and having a pulse width corresponding to an acquisition range of, for example, 50 feet, is disposed aboard a target in a manner to provide Doppler frequency signals each time a missile enters the acquisition range, and that the resultant Doppler frequency signals manifest themselves as the output of source of Doppler frequency 10. Each Doppler cycle fed to squaring circuit 18 undergoes, in the order named, clipping by the two diode configurations including diodes 32, 34, 38 and 40, amplification by T-19, further clipping by diodes 49 and 50, reamplification by T-20, and further shaping by the Schmitt multivibrator. Thus, for each Doppler cycle, a square wave signal having the Doppler frequency in the wave period is produced at the collector of T-24. Emitter-follower transistor 26 reproduces the Doppler cycles and the output of recorder 76 is a single pulse for each cycle applied at the input.

Thus, when the first Doppler frequency signal arrives, the positive-going portion of the square wave at the collector of T-24 is coupled through resistor 82 to T-80 and is reproduced at the emitter with no inversion. When no Doppler is being received, it will be recalled that T-88 is conducting and conduction in T-88′ is at a minimum. With T-88′ conducting, T-86 is cut off and, conversely, with T-88 cut off, T-84 is conducting because of the high collector voltage of T-88. Through the collector-to-emitter circuit of T-84, the base of T-78 is effectively short-circuited to ground. This makes T-78 nonresponsive to the positive-going portion of the first Doppler cycle.

The suddenly rising voltage at the emitter of T-80 is applied through diode 124 and resistor 125 to T-126 and thence to counter 140 which initiates the Doppler count. At the same time, the emitter voltage of T-80 is applied to T-132 which moves it toward saturation. The collector current of T-132 causes the collector voltage to move in a positive direction thereby providing a forward bias at the base of T-157. As collector current in T-157 flows, it charges capacitor 156 negatively for a time proportional to the wavelength of the first Doppler cycle energizing the base of T-80.

The positive-going emitter voltage of T-80 is fed to the base of T-277 whereby MVB-265″ is set to the aforementioned state in which transistors 265 and 265′ are cut off and conducting, respectively. In addition, the positive square wave output to T-80 is differentiated by capacitor 130 and resistor 100 and the negative pulse of the derivative, fed to the base of T-88′, is of sufficient amplitude to trigger MVB-88″ to the alternate state. In the new condition which is established, T-88 operates in the saturation region and the collector voltage of T-88′ is at a positive maximum. The high collector voltage of T-88′ increases the base potential of T-86 and causes its collector to fall effectively to ground potential. The saturated condition of T-88 reduces its collector potential, cutting off T-84. Thus, at the end of the first Doppler cycle, it will be seen that the conditions of transistors 84 and 86 are reversed so that, at a time just prior to the appearance of the second Doppler cycle, the base of T-80 is placed substantially at ground due to the effectively short-circuited collector-emitter junction of T-86 and the previously existing base-to-ground connection of T-78 has been removed.

When the second cycle of the Doppler signal appears at the collector of transistor 24, the positive-going portion of the square wave is fed through T-26 to tape recorder 76 and, additionally, is resistively coupled to the base of T-78 and then reproduced at the emitter with no inversion in polarity. Transistor 80 is inactive because of the low resistance path made through the collector-emitter circuit of T-86, as aforesaid. The positively increasing emitter voltage of T-78 is applied through to T-126 and then to counter 140 whereby the count is advanced. At the same time, through line 122 and resistor 123, the emitter voltage of T-78 is fed to T-121 which moves it toward saturation. The collector current of T-121 causes the collector voltage to move in a positive direction thereby providing a forward bias at the base of T-144. As collector current in T-144 flows, it charges capacitor 150 positively for a time proportional to the wavelength of the second Doppler cycle energizing the base of T-78. In addition, the positive square wave output of T-78 is differentiated by capacitor 112 and resistor 98 and the negative pulse of the derivative, fed to the base of T-88, is of sufficient amplitude to trigger MVB-88″ to the alternate state. The new condition which is established is the same as that prior to receiving the Doppler train, i.e., T-88′ operates in the saturation region and the collector voltage of T-88 is at a positive maximum. The high collector voltage of T-88 increases the base potential of T-84 and causes its collector to fall effectively to ground potential. The saturated condition of T-88′ reduces its collector potential, cutting off T-86. Thus, at the end of the second Doppler cycle, the base of T-78 is placed essentially to ground via T-84 and, via T-86, the short from the base of T-80 to ground is removed. Following this reasoning, T-80 is considered the first cycle emitter follower and T-78 the second cycle emitter follower. The biasing of MVB-88″ is such that the conducting state of T-88′ will prevail in the face of only a single cycle or random disturbance at the collector of T-24.

The sharply rising voltage at the emitter of T-78 is also fed over line 114 to a differentiator comprising capacitor 116 and base resistor 117 of T-118′. It will be recalled that during quiescence of MVB-118″, T-118′ is conducting heavily and T-118 is cut off. The positive pulse produced by the differentiation has no effect on T-118′ because of its conducting state. The negative pulse, however, triggers MVB-118″ to the alternate state so that T-118 begins to conduct and T-118′ is cut off. The collector voltage of T-118 becomes more negative which gives rise to a negative pulse due to the differentiating capacitor 290 and base resistor 263 of T-262. Obviously T-262, being in the cut off condition, is not affected by the negative pulse. The time constants of MVB-118″ are such at the time duration of the square wave voltage at the collector of T-118 is roughly 10μs or slightly greater. The positive-going trailing edge of the collector signal of T-118 produces a positive pulse which causes the base of T-262 to increase positively. Thus, T-262 is driven into saturation with its collector voltage falling essentially to zero. Due to this change, the collector voltage of T-265 of MVB-265″ falls rapidly from the maximum positive value. This negative-going voltage is coupled to the base of T-265′ so that, when T-262 is positively pulsed at the end of the period of the second Doppler cycle, the collector voltage of T-265′ and, of course, T-277, increases rapidly to a maximum positive value which is effective to drive transistors 283 and 284 into conduction whereby, in turn, transistors 285 and 286 are driven into saturation. A path whereby capacitor 150 is discharged may now be traced through line 288 and the essentially short-circuited collector-emitter junction of T-286. Likewise, a path for discharging capacitor 156 may be traced through line 287 and the essentially short-circuited collector-emitter junction of T-285.

Summarizing briefly the operation up to the end of the second cycle of the first pair of Doppler cycles generated in response to penetration of the acquisition range of the target radar by an intercept missile, when no Doppler is present or received, capacitors 150 and 156 are totally discharged and the potential difference at the junction of resistors 152 and 154 and the base of T-184 is zero. The first cycle of Doppler appearing at the collector of T-24 switches T-157 to a conduction state and negatively charges collector capacitor 156 for a time duration determined by the period of the first Doppler cycle. The second cycle of Doppler appearing at the collector of T-24 switches T-144 into a conduction state and positively charges collector capacitor 150 for a time duration determined by the period of the second Doppler cycle. Capacitors 150 and 156 are thus charged with voltages of opposite polarity which define the wavelengths of each pair of Doppler cycles being compared. The algebraic sum of these two charges is fed to the base of T-184 and the capacitors are then discharged to place the circuit in a condition enabling comparison of the wavelengths of the next two Doppler cycles. With a Doppler frequency of increasing wavelength, the algebraic sum from the comparison is positive. This is because the target is approached by the attacking missile and the wavelength of the second cycle of any pair is greater than the first. The algebraic sum therefore remains positive during the time elapsing between missile acquisition and the point of minimum spatial separation of the target and the missile and becomes negative only after the point of closest approach has been reached. Stated otherwise, the negative algebraic sum arises as each projectile leaves the target.

That portion of the invention embodiment which operates to terminate the recording cycle of the counter 140 will now be described. The positive-going collector voltage of T-118′ which signifies the conclusion of two consecutive Doppler cycles is fed to the base of T-190 in the form of a gate pulse and drives T-190 into a state of partial conduction. Since the emitter of T-190 is directly coupled to the emitter of T-184, the level of the collector current of T-190 will also be determined by the emitter voltage of T-184. The circuit constants are chosen such that full conduction of T-190 is possible only if the gate pulse received from T-118′ is applied simultaneously with an emitter signal from T-184. Thus, up to the time of closest approach between the missile and the target, T-184 is cut off and the positive pulsations from T-118′ have no appreciable effect on the condition of T-190. As the missile and the target start to leave each other, the next two Doppler frequency cycles produced charge capacitors 150 and 156 in such a manner that the algebraic sum at the base of T-184 now becomes negative. This causes T-184 to conduct and the rise in collector current causes its emitter voltage to increase in the negative direction. The emitter voltage, in turn, being applied between the base and emitter of T-190 simultaneously with the gate pulse received from T-118′, causes the collector voltage of T-190 to increase in the negative direction. The collector voltage of T-190 is transmitted through emitter-follower T-198 with no inversion and is fed to T-212 which, normally conducting, now becomes cut off. Since the collector voltage of T-212 increases in the positive direction at cut off, T-222 begins to conduct heavily, thereby placing the base of T-230 of MVB-230″ essentially to ground through the low resistance collector-emitter junction of T–222. Since the collector voltage of T–222 provides the base drive for MVB–230″, the collector voltage of T–230 increases positively and regeneratively increases the forward bias on T–230′ so that its collector voltage moves in a negative direction. This represents the other state of MVB–230″. The positive maximum voltage to which the collector of T–230 rises in the cut off condition drives T–258 into heavy conduction. It will be observed that T–80 is now disabled by a ground connection extending from its base and including line 260 and the essentially short-circuited collector-emitter junction of T–258. Further excitation by the counter 140 is thereby terminated. However, full documentation of the available Doppler train is permitted by the uninterrupted operation of tape recorder 76. At the same time, the rapidly falling collector voltage of T–230′ increases the forward bias of T–250 thus lighting the DATA READOUT lamp and giving an indication that Doppler cycle count has been terminated. With T–80 disabled, no further input to counter 140 is permitted. The minimum spatial separation between the target and the missile is readily determined by inserting the information from counter 140 into Equation 12.

It is important to note that since T–118′ of MVB–118″ is triggered by the differentiated negative pip produced by the trailing edge of the second Doppler cycle appearing at the emitter of T–78, and MVB–265″ functions against the trailing edge of the gate pulse fed to T–190 from the collector of T–118′, the gate pulse which the collector of T–118′ gives rise to is fed to the base of T–190 before the discharging of capacitors 150 and 156 takes place. Thus, the Doppler wavelength information contained in the charges of capacitors 150 and 156 is not erased until the base of T–190 has had an opportunity to sense the polarity of the differential voltage produced by the respective charge times.

Referring now to calibration circuit 11, the calibration procedure provides an input signal to the miss distance scoring system embodying the invention which duplicates the conditions in the air when crossover of the target and attacking object occurs. Transistors 12 and 14 comprise an oscillator and have their emitters tied directly to negative terminal (—). Equal values are given to the following component pairs: resistors 291 and 292; resistors 293 and 294; capacitors 295 and 296; and capacitors 297 and 298. Diodes 300 and 302 provide square wave shaping. The oscillator output signal is taken through capacitor 304 and resistor 306 and fed to terminals $b$ and $c$ of section A of the main switch. Terminals $b$ and $c$ of section B of the switch are coupled to one end of resistors 308 and 310, respectively, the other ends of these resistors connecting with the collector of common-emitter transistor 16 having a base resistor 312. Serially-connected capacitor 314 and resistor 316 couple the base of T–16 to the movable arm of a control switch designated CAL-TEST. The fixed terminal of the CAL-TEST switch is coupled by line 318 to the collector of T–121 thereby establishing a feedback path from T–121 to T–16 when the CAL-TEST switch is closed.

Calibration is achieved by manually alternately switching low and high frequency signals through section A of the main switch and performing certain adjustments at each frequency setting. With the rotors of the switch set to terminal $b$ and the CAL-TEST switch open, the signal from source 10 is disconnected and a steady signal of roughly 250 c.p.s. is obtained. Capacitor 295 is placed in parallel with capacitor 298 and capacitor 296 and capacitor 297 are in parallel. In position $c$, the connections to one end of capacitors 297 and 298 are broken and the output signal increases to around 1250 c.p.s. With the CAL-TEST switch still open, the test point CAL-TP at the collector of T–212 is monitored on an oscilloscope while adjusting the BALANCE resistor (at T–157) for equal pulse amplitude at 225 c.p.s. and 1250 c.p.s.

Assume that amplitude balance is achieved and that the CAL-TEST switch is closed. The first cycle fed to squaring circuit 18 gives rise to conditions to which discussion has been given hereinabove. Suffice to say that in response to the first cycle MVB–88″ assumes its other state and capacitor 156 is charged negatively through the operational sequence involving transistors 86, 80, 132, and 157. The second cycle gives rise to similar conditions which also have been described hereinabove. That is, the second cycle of voltage from the oscillator produces a positive charge on capacitor 150 through circuit performance which includes the transistors 84, 78, 121, and 144. However, one change ensues. With the CAL-TEST switch closed, T–16 is driven to saturation when T–121 fires and places either resistor 308 or resistor 310 in parallel with base resistor 293 of T–12, depending on whether the low or high frequency selection from the oscillator is made. Consequently, when the calibration oscillator is employed and the CAL-TEST switch is closed, the oscillator frequency decreases slightly on alternate cycles which gives rise to a condition of diminishing wavelength. In the invention embodiment, resistors 308 and 310 are so selected to give a wavelength difference of approximately 50 μs. As the cyclic input continues, the difference voltage at the base of T–184 reaches essentially the same negative value before the charge values on capacitors 150 and 156 are erased. The CAL-LEVEL resistor is adjusted until MBV–230″ functions to cause the DATA-READOUT lamp to light. By the procedure described hereinabove, relating to operation of the RO-CANCEL switch, system readiness for scoring demands may be obtained.

Once calibration has been achieved, proper calibration during actual scoring can be ascertained by coupling the test oscillator into the system and operating the CAL-TEST switch. Only slight adjustments of the CAL-LEVEL control will occasionally then be required at the high and low frequencies.

Figure 4:
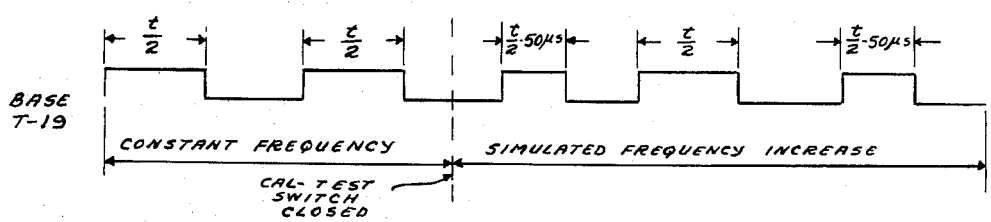
FIG. 4 shows a waveform relating to calibration procedure of the invention embodiment shown in FIGS. 2a and 2b.

Referring now to FIG. 4, the waveform of the oscillator output as it would appear at the collector of T–24 is shown. Prior to the time the CAL-TEST switch is closed the frequency of the oscillator-generated pulsations is constant. Each half-period is labelled $t/2$. When the CAL-TEST switch is closed, the period of alternate cycles is roughly 50 μs. less than the wavelength of the preceding cycle. A simulated frequency increase duplicating the Doppler phenomena observed when the target and attacking object leave each other is thus produced.

The FULL-DOP/2 switch renders a division by two of the Doppler count for easier evaluation of the data fed to the counter 140.

Although only one embodiment of the invention has been illustrated and described, it will be apparent to those skilled in the art that various changes and modifications may be made therein without departing from the spirit of the invention or the scope of the appended claims.

I claim:

1. A system for indicating the minimum distance between a target and a projectile fired at the target comprising: a source of Doppler frequency signals effective when the target and projectile are within a predetermined distance of each other to produce signals of increasing wavelength as the projectile moves toward the target and of decreasing wavelength once the target and projectile pass each other, differential voltage producing means responsive to each pair of successive Doppler cycles for producing a differential voltage continuously of one polarity as the projectile moves toward the target and a differential voltage continuously of the opposite polarity once the target and the projectile pass each other, a counter energized in unit steps by each Doppler frequency signal produced, signal cancellation means effective following the generation of said each pair of successive Doppler cycles for cancelling any differential component of said differential voltage producing means in a manner that the instantaneous polarity of said differential voltage is dependent on the instantaneous positions of said target and projectile relative to each other, and cancellation means supplied with said differential voltage for terminating the counting operation of said counter when said differential voltage changes from said one polarity to said opposite polarity thereby yielding miss distance directly related to the readout of said counter.

2. A system for indicating the minimum distance between a target and a projectile fired at the target comprising: a source of Doppler frequency signals effective when the target and projectile are within a predetermined distance of each other to produce signals of increasing wavelength as the projectile moves toward the target and of decreasing wavelength once the target and projectile pass each other, two capacitors, first capacitor charging means of one polarity responsive to the first cycle of a pair of successive Doppler cycles for charging one of said capacitors to a level proportional to the wavelength of said first cycle, second capacitor charging means of the opposite polarity responsive to the second cycle of said pair of successive Doppler cycles for charging the other of said capacitors to a level proportional to the wavelength of said second cycle, the connection of said capacitors being such that said capacitors produce a differential voltage continuously of one polarity as the distance between said target and projectile decreases and continuously of the opposite polarity as the distance between said target and projectile begins to increase, a counter controlled by said first and second capacitor charging means for indicating the number of input Doppler cycles, signal cancellation means controlled by said second capacitor charging means for simultaneously establishing discharge paths for said capacitors at the end of the combined periods of said pair of successive Doppler cycles thereby rapidly diminishing substantially to zero the charge on said capacitors in readiness for the next pair of successive cycles, and polarity sensitive means controlled by said differential voltage for terminating the counting operation of said counter when said differential voltage changes from said one polarity to said opposite polarity thereby yielding miss distance directly related to the readout of said counter.

3. A system for indicating the minimum distance between a target and a projectile fired at the target comprising: a source of Doppler frequency signals which increase in wavelength as the target and projectile move toward each other and which decrease in wavelength as the target and projectile move away from each other, pulse shaper means responsive to said Doppler frequency signals for converting each Doppler cycle into a substantially rectangular wave, two capacitors, first capacitor charging means for producing a charging current through one of said capacitors to establish a voltage of one polarity and magnitude proportional to the wavelength of the first of two successive rectangular waves to be produced, second capacitor charging means for producing a charging current through the other capacitor to establish a voltage of the opposite polarity and magnitude proportional to the wavelength of the second of said two successive rectangular waves, the connection of said capacitors being such that said capacitors produce a differential voltage continuously of one polarity as the target and projectile move toward each other and continuously of the opposite polarity beginning with movement of the target and projectile away from each other, an indicator controlled by said first and second capacitor charging means responsive to said rectangular waves, signal cancellation means controlled by said second capacitor charging means for simultaneously establishing discharge paths for said capacitors at the end of the combined periods of said two successive rectangular waves thereby rapidly diminishing substantially to zero the charge on said capacitors in preparation for the next pair of successive cycles, and polarity sensitive means controlled by said differential voltage for terminating the counting operation of said indicator when said differential voltage changes to said opposite polarity.

4. A system for indicating the minimum closing distance between a target and a projectile fired at the target comprising: a source of Doppler frequency signals effective when the target and projectile come within a predetermined distance of each other to produce signals of increasing wavelength as the projectile moves toward the target and of decreasing wavelength once the target and projectile pass each other, pulse shaper means responsive to said Doppler frequency signals for generating a substantially rectangular wave from each Doppler cycle, two capacitors, first capacitor charging means for producing a charging current through one of said capacitors to establish a voltage of one polarity and magnitude proportional to the wavelength of the first of two successive rectangular waves to be generated, second capacitor charging means for producing a charging current through the other capacitor to establish a voltage of the opposite polarity and magnitude proportional to the wavelength of the second of said successive rectangular waves, the connection of said capacitors being such that said capacitors produce a differential voltage continuously of one polarity as the target and projectile move toward each other and continuously of the opposite polarity as the target and projectile move away from each other, a counter controlled by said first and second capacitor charging means and having a response which increases with the number of said rectangular waves, signal cancellation means controlled by said second capacitor charging means for simultaneously establishing discharge paths for said capacitors at the end of the combined periods of said two successive rectangular waves thereby rapidly diminishing substantially to zero the charge on said capacitors in preparation for the next pair of successive cycles, and polarity sensitive means controlled by said differential voltage for terminating the counting operation of said counter when said differential voltage changes to said opposite polarity thereby yielding miss distance directly related to the readout of said counter.

5. A system for indicating the minimum distance between a target and a projectile fired at the target comprising: a source of Doppler frequency signals effective when the target and projectile are within a predetermined distance of each other to produce signals of increasing wavelength as the projectile moves toward the target and of decreasing wavelength once the target and projectile pass each other, pulse shaper means receiving said Doppler frequency signals for generating a substantially rectangular wave from each Doppler cycle, first and second transistors both connected as emitter followers, means for applying said rectangular waves simultaneously to the control electrodes of said transistors, third and fourth transistors coupled in controlling relation to said first and second transistors, respectively, a monostable flip-flop controlling said third and fourth transistors which switches to a stable state in which the base of said first transistor is coupled to a high impedance path which includes said third transistor and the base of said second transistor is effectively grounded by law impedance path which includes said fourth transistor, said flip-flop being triggered by the emitter pulses of said first and second transistors and being switched into the alternate state by the emitted pulse from said first transistor in reponse to the application of the first wave of a pair of successive rectangular waves to said first and second transistors, whereby at the conclusion of said first rectangular wave said first transistor is effectively grounded by a low impedance path which includes said third transistor and the control electrode of said second transistor is coupled to a high impedance path which includes said fourth transistor, said flip-flop being switched to said stable state thereof by the emitter pulse of said second transistor in response to the second wave of said pair of successive rectangular waves, differential voltage producing means fed by the emitter pulses of said first and second transistors for producing a differential voltage continuously of one polarity as the projectile moves toward the target and a differential voltage continuously of the opposite polarity once the projectile moves past the target, signal cancellation means energized by the emitter pulse of said second transistor for cancelling any differential component of said differential voltage producing means in a manner that the instantaneous polarity of said differential voltage is dependent on the instantaneous positions of the target and projectile relative to each other, a counter energized asymmetrically by the respective emitter pulses of said first and second transistors, and cancellation means responsive to said differential voltage for disabling said first transistor when said differential voltages changes from said one to said opposite polarity thereby yielding miss distance directly related to the readout of said counter.

6. In combination with a system as claimed in claim 5, calibration test means for obtaining an apparent reducing range between the target and a projectile traversing said predetermined distance and moving toward the target comprising: an oscillator of predetermined frequency, manual switch means for interrupting the coupling between said source of Doppler frequency signals and said pulse shaper means and coupling the output of said oscillator to said pulse shaper means at times when simulation of crossover between a target and projectile is desired, transistor switch means coupled between said oscillator and said second transistor and responsive to each emitter pulse from said second transistor for changing the frequency of said oscillator from said predetermined frequency to a frequency slightly higher than said predetermined frequency every alternate cycle, said increasing frequency of alternate cycles duplicating the condition of diminishing wavelength of successive cycles during passage of the target and projectile by each other.

No references cited.

CHESTER L. JUSTUS, *Primary Examiner.*